Patented Dec. 5, 1922.

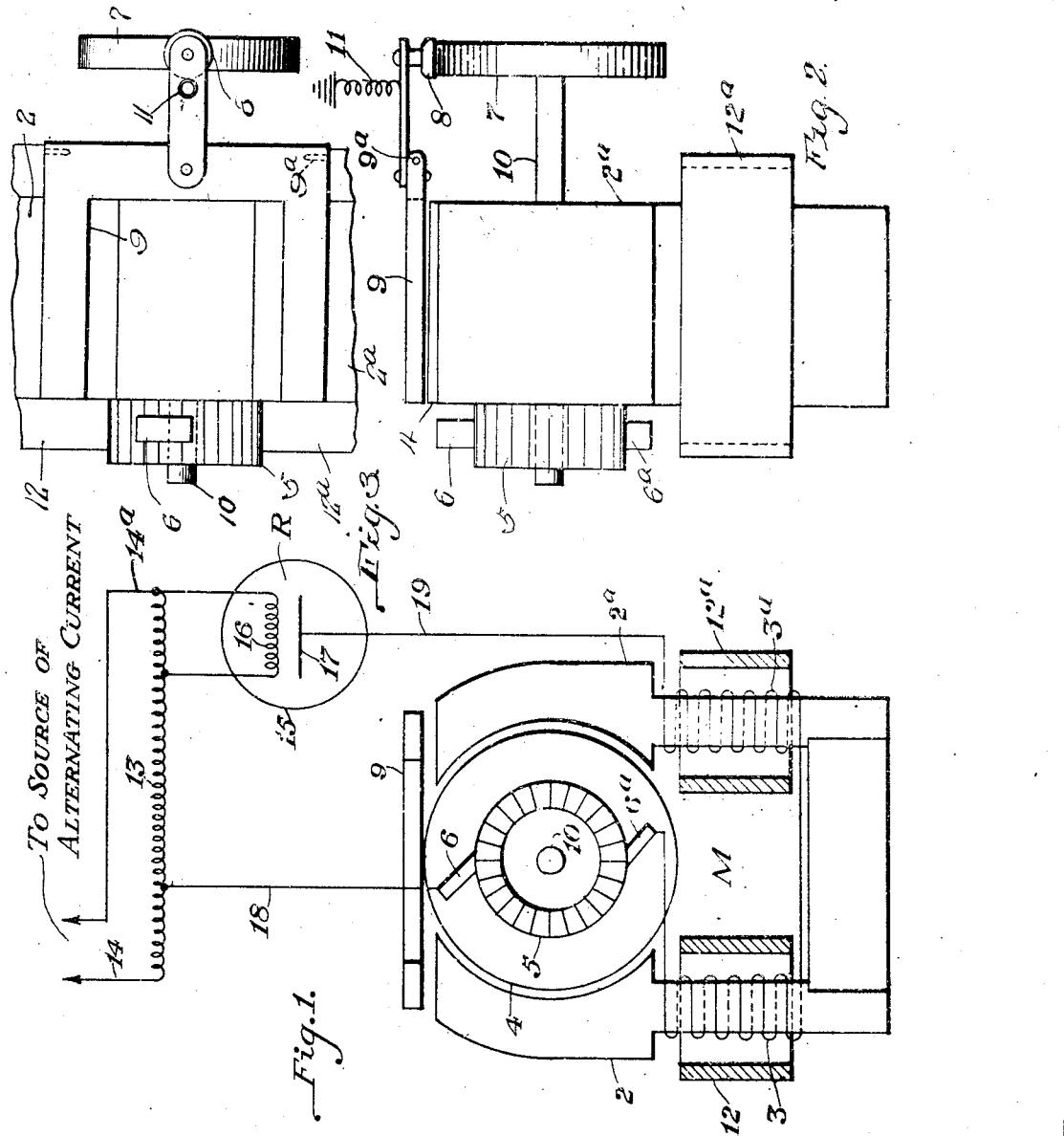

1,437,421

UNITED STATES PATENT OFFICE.

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC MOTOR.

Application filed June 26, 1919. Serial No. 306,925.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Electric Motors, of which the following is a specification.

My invention relates to electric motors, and particularly to direct current motors which are operated by pulsating direct current.

One object of my invention is the provision of means for increasing the efficiency of a direct current motor when the motor is supplied with pulsating direct current.

I will describe one form of motor embodying my invention, and will then point out the novel features thereof in claims.

In the accompanying drawings, Fig. 1 is a view showing in end elevation one form of motor embodying my invention, together with means for supplying the motor with pulsating direct current from an alternating current source. Fig. 2 is a side view, and Fig. 3 a top view of the motor shown in Fig. 1.

Similar reference characters refer to similar parts in each of the views.

Referring first to Fig. 1, the reference character M designates a direct current motor of the series type comprising, as usual, field cores 2 and $2^a$, field windings 3 and $3^a$, a rotatable armature 4, a commutator 5, and brushes 6 and $6^a$.

As shown in Fig. 2, the armature shaft 10 carries a brake drum 7. Coacting with this drum is a brake shoe 8 which is controlled by a tractive armature 9 pivotally mounted at $9^a$ and located directly above the ends of the field cores 2 and $2^a$. When the motor is not energized, the shoe 8 is pressed against the drum 7 by a spring 11, but when the motor becomes energized the force exerted on armature 9 due to the magnetic flux passing therethrough from the field of the motor over-balances the action of the spring 11 and causes shoe 8 to leave the drum. It will be seen, therefore, that the brake device causes a quick stop of the rotating armature 4 when the motor becomes de-energized.

Surrounding the field winding 3 is a band or sleeve 12 of electro-conductive material such as copper, and surrounding the other field winding $3^a$ is a similar band or sleeve $12^a$. The purpose of these bands will be explained hereinafter.

Considering now the means for supplying current to the motor, the reference character 13 designates an inductive winding connected across wires 14 and $14^a$ to which alternating current is supplied from a suitable source as indicated in the drawing. One terminal of the motor is connected with a suitable point in winding 13 by a wire 18, and a rectifying device R is interposed between this winding and the remaining motor terminal. The rectifying device comprises a bulb 15 containing an inert gas, such as nitrogen, at low pressure, a filament 16, and a plate 17. One form of device of this character is known commercially as a "tungar rectifier." The filament 16 is connected across a portion of the winding 13, so that this filament is heated by the alternating current which is supplied to it from the winding. One terminal of the motor is connected with the plate 17 by a wire 19. It will be seen that by virtue of this structure the motor is supplied with pulsating direct current.

The advantages due to the use of the bands 12 and $12^a$, are as follows:

The operation of the brake device is improved, because the pole-pieces 2 and $2^a$ are caused to act as slow-releasing magnets. I have found that if the motor, without these bands, is operated on pulsating current of the character supplied by the rectifier R, the brake is apt to chatter sufficiently to permit the shoe 8 to touch the brake drum 7 and so to interfere with the operation of the motor. This difficulty is entirely removed by the provision of the bands 12 and $12^a$.

The bands greatly reduce the voltage necessary to force the pulsating current through the field coils. The pulsating current supplied to the motor meets with an impedance in substantially the same way as an alternating current, but the bands serve as closed secondary windings, and so they reduce this impedance to a very small value. By actual test I have found that with these bands the motor will operate on about one-quarter of the alternating current voltage which is required without the bands.

The pulsating current produces iron losses in the fields of the motor in much the same manner as does an alternating current. These losses vary with the amount of variation of the magnetic flux during each pulsation. Since the bands reduce the variation in the flux they also reduce the iron losses.

When the magnetic flux produced by the fields of a motor is alternating or pulsating, an electromotive force is produced in the armature by transformer action, and this electromotive force produces a current in the turns which are short circuited by the brushes and the breaking of this current as the commutator segments pass out from under the brushes tends to produce sparking. Since the bands reduce the variations in the field flux, they reduce the sparking at the brushes.

Although I have herein shown and described only one form of motor embodying my invention and only one means for supplying pulsating current to this motor, it is understood that various changes and modifications may be made therein within the scope of the appended claims without departing from the spirit and scope of my invention.

Having thus described my invention what I claim is:

1. A direct current motor adapted for operation by pulsating current, and comprising field cores, a tractive armature controlled by the magnetic flux in said cores, a braking device governed by said tractive armature for arresting movement of the rotatable armature, and bands of electro-conductive material surrounding said field cores.

2. A direct current motor adapted for operation by pulsating current, and comprising field cores, a rotatable armature receiving a portion of the magnetic flux supplied by said cores, a tractive armature receiving another portion of the flux supplied by said cores, a braking device governed by said tractive armature for arresting movement of the rotatable armature, and bands of electro-conductive material surrounding said field cores.

In testimony whereof I affix my signature in presence of two witnesses.

JOHN S. HOLLIDAY.

Witnesses:
A. HERMAN WEGNER,
R. L. KISTLER.